Sept. 14, 1965 W. C. BELK 3,205,926
APPARATUS FOR SECTIONIZING CITRUS FRUIT
Filed April 30, 1962 3 Sheets-Sheet 2
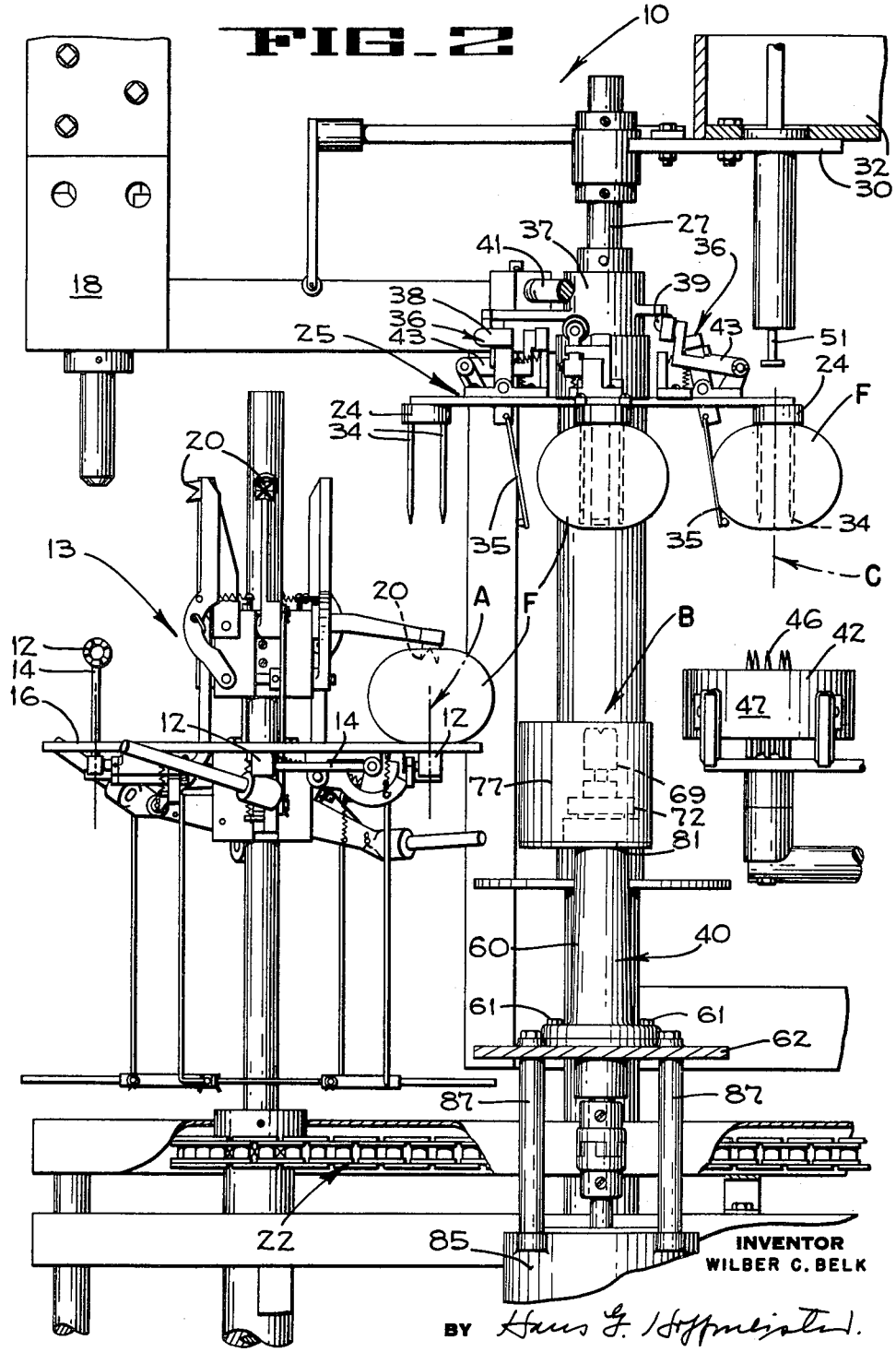
INVENTOR
WILBER C. BELK
BY Hans G. Hoffmeister
ATTORNEY Sept. 14, 1965 W. C. BELK 3,205,926
APPARATUS FOR SECTIONIZING CITRUS FRUIT
Filed April 30, 1962 3 Sheets-Sheet 3
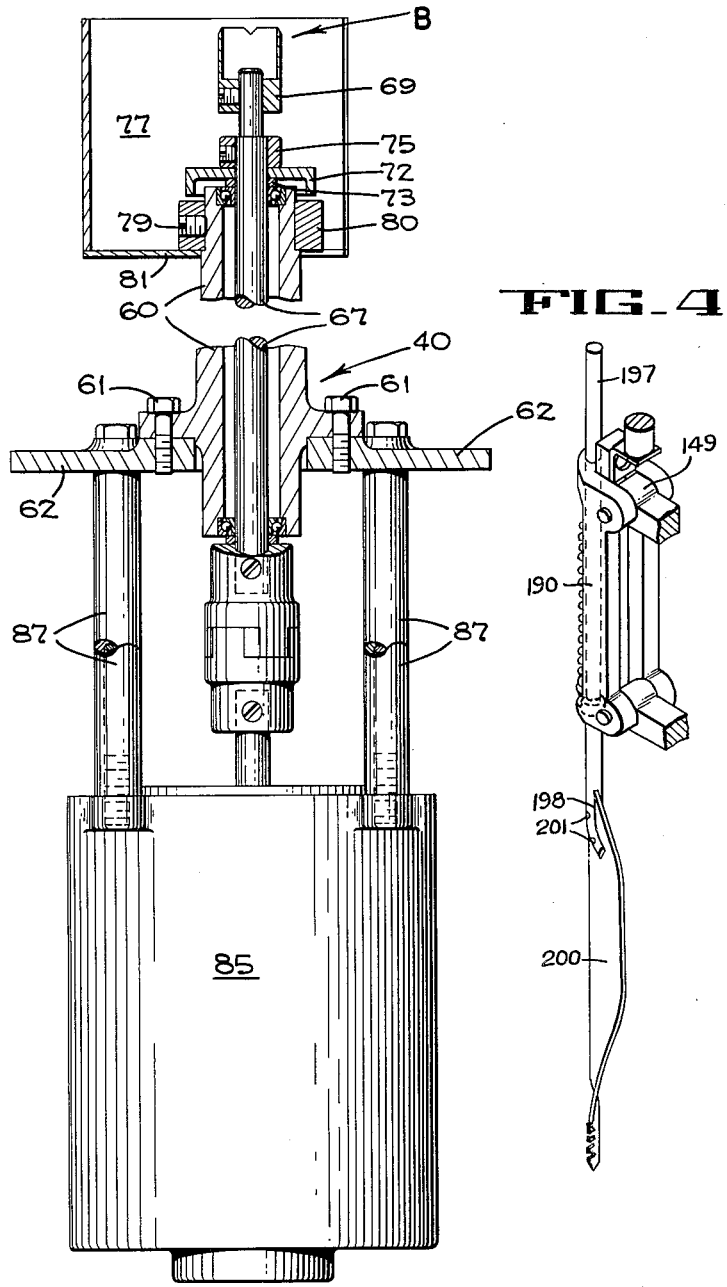
FIG_3
FIG_4
INVENTOR
WILBER C. BELK
BY Hans G. Hofmeister
ATTORNEY

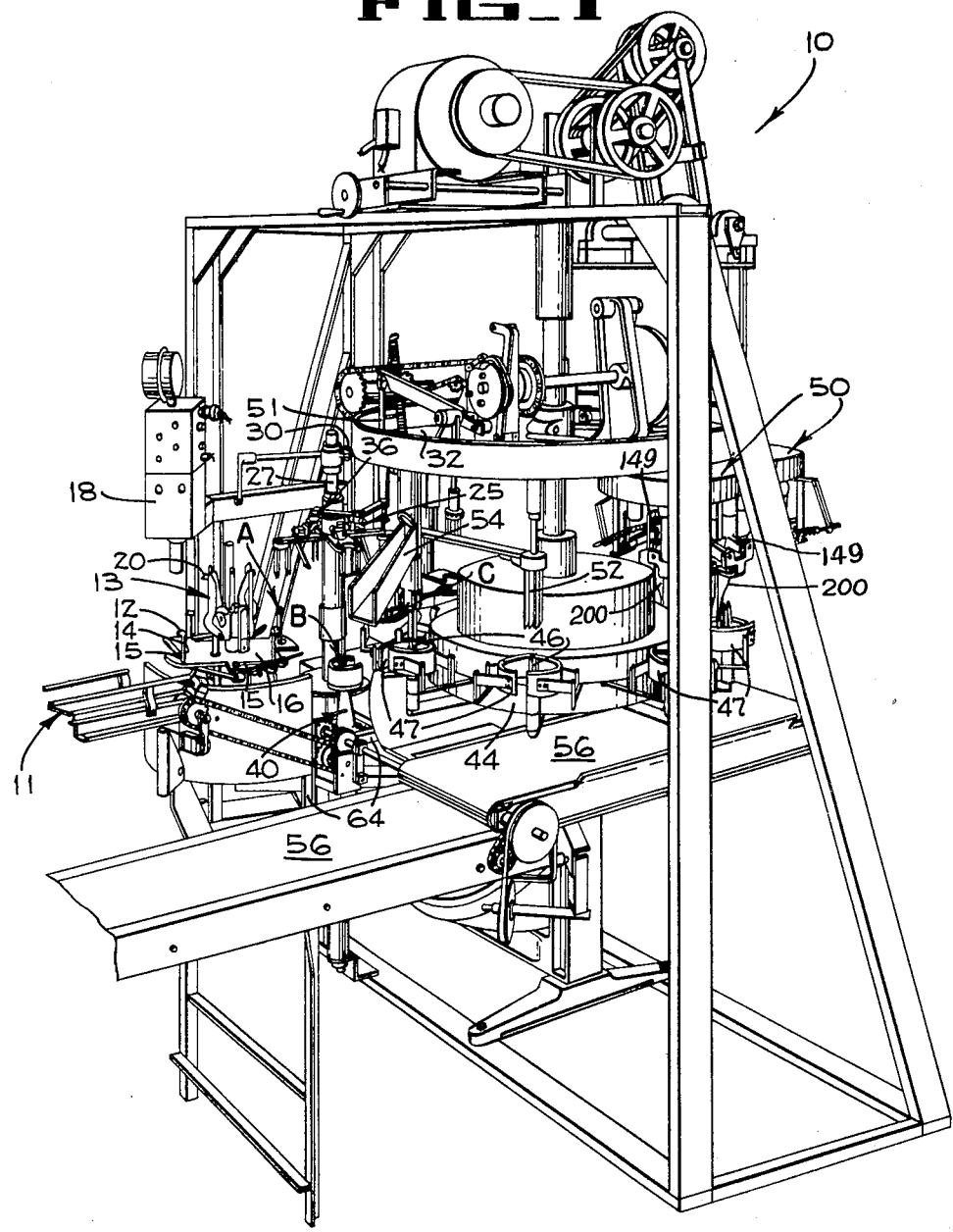

United States Patent Office 3,205,926
Patented Sept. 14, 1965

3,205,926
APPARATUS FOR SECTIONIZING
CITRUS FRUIT
Wilber C. Belk, Lakeland, Fla., assignor to FMC Corporation, San Jose, Calif., a corporation of Delaware
Filed Apr. 30, 1962, Ser. No. 190,898
6 Claims. (Cl. 146—3)

This invention pertains to an improved apparatus for sectionizing citrus fruit.

In certain grapefruit sectionizing machines the grapefruit to be sectionized is held in fixed position while sectioning blades are moved downwardly through the fruit between each radial membrane and the adjacent meat segments. The blades are so designed and manipulated that substantially all of the meat segments are separated from the membranes which remain attached to the core. However, in addition to the radial membranes, the core is attached to the meat segments at the stem end of the fruit by string-like members and other connectors which, in some cases, prevent the meat segments from falling away from the core even if the segments have been separated from the radial membranes.

It is therefore an object of the present invention to provide an apparatus for severing all strings and connections of the meat segments of a citrus fruit to the core of the fruit.

Another object is to provide an improved cutter for a citrus fruit sectionizing machine.

Other and further features, objects and advantages of the present invention will become apparent from the following description taken in connection with the accompanying drawings in which:

FIGURE 1 is a perspective of a citrus fruit sectionizing machine embodying the stem end cutter of the present invention.

FIGURE 2 is an enlarged fragmentary elevation of the feed and transfer turrets of the machine of FIGURE 1.

FIGURE 3 is an enlarged fragmentary elevation of a portion of FIG. 2, particularly showing the stem end cutter of the present invention and its drive mechanism.

FIGURE 4 is an enlarged fragmentary elevation of a portion of FIGURE 1, particularly showing the sectionizing blade of the present invention and its support mechanism.

In FIGURES 1 and 2 one embodiment of the stem end cutter of the present invention is shown incorporated in a citrus fruit sectionizing machine 10 which is disclosed in my pending application Ser. No. 823,107, now Patent Number 3,105,531. Since the entire machine 10 is completely disclosed in said patent, only those parts of the machine that have been modified to accomodate the stem end cutter of the present invention will be described in detail herein, it being understood that reference may be had to said patent for a complete descripiton of the construction and operation of all mechanisms of the machine that are not described in detail herein.

In general, the machine 10 comprises a conveyor 11 on which grapefruit, which have been peeled and treated with lye, are delivered to an operator who stands adjacent a feed turrent 13. The operator removes each grapefruit from the conveyor 11, places the stem end of the fruit against a positioning ring 12 of a lever 14, and swings the lever down into a recess 15 (FIG. 1) in a base plate 16 of the feed turret. With the stem end held against shifting by the ring 13, the fruit is pivoted about the stem end to position the blossom end in alignment with a beam of light projected downwardly from a projector 18. When the beam has been directed onto the blossom end of the fruit, a clamp 20 is swung downwardly to lock the fruit on the plate 16 of the feed turret.

The feed turret 13 is arranged to be intermittently indexed in a clockwise direction (FIG. 1) in 90 degree angular increments by a drive mechanism indicated generally by reference numeral 22 (FIG. 2). When the feed turret has been indexed twice, the fruit F (FIG. 2) comes to rest at a transfer station A immediately below a clamp 24 carried on a transfer turret 25 which is arranged to be indexed in a counterclockwise direction (FIG. 1) about the axis of a shaft 27. Besides being rotatable, the transfer turret 25 is mounted for vertical movement due to the fact that the upper end of the turret shaft 27 is connected by a bracket 30 to a vertically movable tool carrier 32 which carries various fruit processing tools of the machine 10.

When a fruit is held at station A of the feed turret 13 and the transfer turret 25 is lowered, a prong unit 34 of the clamp 24 penetrates into the fruit and a spring arm 35 is moved into engagement with the side of the fruit to the lock the fruit on the prong unit. A camming and latching mechanism 36 is arranged to control the movement of each spring arm into and out of engagement with the fruit on the prong unit 34. This camming and latching mechanism 36 is fully described in the application of Hans W. Grotewold, Ser. No. 46,662, now Patent 3,132,750 which is assigned to the assignee of the present invention. In general this mechanism 36 comprises a hub 37 which is rotatably mounted on the transfer turret shaft 27 and carries two cams 38 and 39. A link 41 is arranged to be periodically actuated in timed relation to the movement of the transfer turret to oscillate said cams when the turret is in its lowered position. Cam 38 engages the actuating linkage of a spring arm 35 at station A to swing it into engagement with the fruit and to cause a latch mechanism 43 to engage that linkage. At the same time, cam 39 engages the latch mechanism 43 at station C to unlatch the spring arm 35 at that station and permit the arm to swing away from the fruit.

When the spring arm 35 at station A has moved into clamping engagement with the fruit, the clamp 20 of the feed turret is released and the transfer turret is raised, lifting the fruit away from the base plate 16. When the transfer turret is next indexed through a 90 degree angular movement, the fruit is positioned at station B (FIG. 2) above the stem end cutter 40 of the present invention which will be described in detail hereinafter. In general, the cutter 40 is a continuously rotating cylindrical cutter that has an upwardly directed circular cutting edge. Accordingly, when the transfer turret is next lowered, the cutter 40 cuts a circular cut in the lower stem end of the fruit to sever all connections between the meat segments of the fruit and the core at the stem end.

Next, the transfer turret 25 is raised and then indexed through another 90 degree increment to position the fruit at station C above a fruit carrier 42 that is mounted on a main turret 44 (FIG. 1) of the machine. When the transfer turret is lowered, the fruit is impaled on a prong-type spindle 46 disposed centrally in a fruit clamping mechanism 47. At this point the spring arm 35, which is bearing against the side of the fruit, is released by the cam 39 and a hold-down member 51, that is carried by the tool carrier 32, is moved down into engagement with the top of the fruit and holds it on the spindle 46 while the transfer turret is raised, thus completing the transfer of the fruit from the transfer turret 25 to the main turret 44.

The main turret 44 is arranged to be rotated clockwise (FIG. 1) to successively position each fruit carried in a fruit carrier 42 below a series of processing tools including four heads 50 (two only being shown) which carry sectionizing blades 200, a stripper mechanism 52, and a core removal unit 54. Each tool is arranged to engage the fruit and perform a particular operation thereon as the tool carrier 32 is lowered. In particular, it should be noted that each head 50 carries a plurality of sectionizing blades 200 (more clearly illustrated in FIGURE 4) which penetrate into the upper end of the fruit and work their way downwardly between each meat segment of the fruit and its enclosing membranes to separate the segments from the membranes. One type of sectionizing blade 200 is illustrated in FIGURE 4, and the operation thereof is described in detail in the above referenced Patent No. 3,105,531. In general, each sectionized blade 200, as shown in FIGURE 4, is mounted in a wedge-shaped groove 198 provided in a blade supporting rod 197. The rod 197 is mounted in a vertical position in a blade support member 190 which is suitably attached to a control mechanism 149 mounted on a sectionizing head 50 (shown in FIGURE 1). After the fruit has been subjected to the action of the stripper 52, the segments of the fruit have been effectively separated from the core, and the segments drop onto a discharge conveyor 56 which carries them to a collection station.

As best seen in FIGS. 2 and 3, the stem end cutter 40 of the present invention comprises a tubular support member 60 which is secured by capscrews 61 to a fixed plate 62 that is connected to the support structure 64 of the machine by a suitable bracket. A drive shaft 67 is journalled for rotation in the tubular member 60 and carries a cylindrical cutter 69 at its upper end. The cutter, which is setscrewed to shaft 67 has a sharpened, generally circular, upwardly projecting, notched cutting edge. A deflector 72 is locked on shaft 67 between a washer 73 and a set collar 75. A shield 77, which is formed as part of a cylinder, is secured around the cutter on the upper end of the tubular support member 60 by means of a setscrew 79 that is threaded through a collar 80 welded to a base plate 81 of the shield, said plate having a drain aperture therein.

The cutter is driven by an electric motor 85 which may be energized from any suitable source of electric power and is supported from the fixed plate 62 by four posts 87. During operation of the machine the motor 85 is continuously in operation to continuously rotate the cutter 40.

As previously mentioned, when the fruit is carried downwardly at station B, the fruit is moved into engagement with the cutter 40. This cutter should be about 1 inch in diameter and should be positioned so that it penetrates into the fruit about ½ inch when the transfer turret is at the bottom of its downward movement.

Heretofore the meat segments of the fruit have been separated from the core, either by the manual manipulation of a sectionizing blade or by a machine but, in each case, cuts have been made into the fruit from one end of the fruit only. Accordingly, a violent shaking or stripping action at the end of the sectionizing operation was relied upon to break loose any connections between the other end of the fruit and the core. The present invention provides a new, improved method of sectionizing which comprises the steps of making a circular cut in one end of the fruit around the core to cut the connections of the meat segments to the core at that end, and then entering the opposite end of the fruit and progressively separating each meat segment from its adjacent membrane. As each segment is separated from its two enclosing membranes, it will drop away from the core since all connections to the core have been broken. The new improved method of sectionizing citrus fruit is claimed in my pending application entitled Method of Sectionizing Citrus Fruit and assigned to the same assignee as the present application.

Further, the stem end cutter and the associated mechanisms of the machine, including the sectionizing heads 50 provide an effective mechanism for carrying out this method which, of course, could be carried out by the manual manipulation of a suitable cutter and a sectionizing blade.

Having thus described my invention what I claim as new and desire to protect by Letters Patent is:

1. In a citrus fruit sectionizing machine, a turret having a plurality of fruit clamping units, means mounting said turret for vertical reciprocating movement and for angular indexing movement about a vertical axis to successively position each clamping unit at a plurality of stations, a cutter disposed below said turret at one of said stations and having an upwardly projecting circular cutting edge, a fruit carrier disposed below said turret at a second station, means for continuously rotating said cutter, and means for consecutively lowering said turret a predetermined distance to move the lower end of a fruit held by one of said turret clamping units into engagement with said cutter to cut the meat segments of the fruit from the core of the fruit at the said lower end of the fruit while leaving all portions of the fruit in place, raising said turret, indexing said turret to said second station, and lowering said turret to position the fruit on said one clamping unit into said fruit carrier.

2. In a citrus fruit sectionizing machine, a main turret mounted for rotary movement about a vertical axis, a plurality of fruit carriers on said main turret, a tool carrier mounted above said turret for vertical reciprocating movement, a plurality of sectionizing heads mounted on said tool carrier, each head having a plurality of sectionizing blades projecting downwardly toward said main turret, a transfer turret adjacent said main turret and mounted for vertical reciprocating movement and for rotation about a vertical axis, a fruit clamping unit on said transfer turret, a rotary cylindrical cutter mounted below said transfer turret and having a substantially circular cutting edge projecting upwardly toward said transfer turret, means for positioning a fruit in said clamping unit with its stem end facing downwardly, means for lowering and raising said transfer turret to successively move the fruit into contact with said cutter to have a circular cut made therein encircling the core of the fruit and then return the fruit to elevated position, means for rotating said transfer turret through a predetermined angular movement to position the clamping unit and the fruit above one of said fruit carriers on said main turret, means for transferring the fruit from said clamping unit to said one fruit carrier, means for rotating said main turret through predetermined angular increments to successively position said one fruit carrier below and in vertical alignment with one of said sectionizing heads, and means for reciprocating said tool carrier to move the blades of said one head downwardly into and through the fruit in said one fruit carrier, each blade being movable between a radial membrane of the fruit and the adjacent meat segment to separate the meat segment from said membrane.

3. In a citrus fruit sectionizing machine, a fruit support member, a tool carrier mounted above said fruit support member for vertical reciprocating movement, a sectionizing head mounted on said tool carrier and having a plurality of sectionizing blades projecting downwardly toward said fruit support member, a transfer turret adjacent said fruit support member and mounted for vertical reciprocating movement and for rotation about a vertical axis, a fruit clamping unit on said transfer turret, a rotary cylindrical cutter mounted below said transfer turret and having a substantially circular cutting edge projecting upwardly toward said transfer turret, means for positioning a fruit in said clamping unit with its stem end facing downwardly, means for lowering and raising said transfer turret to successively move the fruit into contact with said cutter to have a circular cut made therein encircling the core of the fruit and then return the fruit to elevated position, means for rotating said transfer turret through a predetermined angular movement to position said clamping unit and the fruit above said fruit support member, means for transferring the fruit from said clamping unit to said fruit support member, and means for lowering said tool carrier to move the blades of said head downwardly into and through the fruit in said fruit support member, each blade being movable between a radial membrane of the fruit and the adjacent meat segment to separate the meat segment from said membrane.

4. In a citrus fruit sectionizing machine, a main turret mounted for rotary movement about a vertical axis, a plurality of fruit carriers on said main turret, a tool carrier mounted above said turret for vertical reciprocating movement, a plurality of sectionizing heads mounted on said tool carrier, each head having a plurality of sectionizing blades projecting downwardly toward said main turret, a transfer turret adjacent said main turret and mounted for vertical reciprocating movement and for rotation about a vertical axis, a fruit clamping unit on said transfer turret, a rotary cylindrical cutter mounted below said transfer turret and having a substantially circular cutting edge projecting upwardly toward said transfer turret, means for positioning a fruit in said clamping unit with its stem end facing downwardly, means for lowering and raising said transfer turret to successively move the fruit into contact with said cutter to have a circular cut made therein encircling the core of the fruit at the stem end and then return the fruit to elevated position, means for rotating said transfer turret through a predetermined angular movement to position the fruit above one of said fruit carriers on said main turret, means for transferring the fruit from said clamping unit to said one fruit carrier, means for rotating said main turret through predetermined angular increments to successively position said one fruit carrier below and in vertical alignment with each of said sectionizing heads, means for repeatedly reciprocating said tool carrier to move the blades of each head downwardly into and through the fruit in said one fruit carrier, each blade being movable between a radial membrane of the fruit and the adjacent meat segment to separate the meat segment from said membrane, and means disposed below a portion of said main turret for receiving fruit segments that have been released from the fruit core by said cylindrical cutter and said sectionizing blades.

5. In a citrus fruit sectionizing machine, a fruit clamping unit mounted for vertical reciprocating movement, means for positioning a fruit in said clamping unit with the stem-blossom axis of the fruit disposed generally vertically and with the stem end of the fruit facing downwardly, a motor mounted below said clamping unit and having an upwardly projecting shaft, a cylindrical cutter secured to the upper end of said shaft, a shield enclosing said cutter, and means for moving said unit downwardly a predetermined distance to move the stem end of the fruit into engagement with said cutter to cut the meat segments of the fruit from the core of the fruit at a substantially predetermined distance in the said stem end of the fruit encircling the core of the fruit.

6. In a citrus fruit sectionizing machine, a fixed support structure, a fruit clamping unit, means mounting said unit for vertical reciprocating movement on said structure, means for positioning a fruit in said clamping unit with the stem end facing downward, an upstanding tubular support member on said structure, a drive shaft projecting upwardly through said tubular support member and rotatably journalled therein, a motor having an output shaft coupled to said drive shaft, a rotary cylindrical cutter secured to the upper end of said drive shaft and having an upwardly facing circular cutting edge, a shield enclosing said cutter and having an apertured bottom wall secured to said tubular support member, and means for moving said clamping unit downwardly a predetermined distance to move the fruit into engagement with said rotary cutter to sever the meat segments of the fruit from the core of the fruit at a predetermined depth in the stem end of the fruit in said clamping unit.

References Cited by the Examiner

UNITED STATES PATENTS

| | | | |
|---|---|---|---|
| 2,475,559 | 7/49 | Wilson | 146—52 X |
| 2,495,422 | 7/50 | Rigney | 146—52 |
| 2,627,884 | 2/53 | Polk et al. | 146—3 |
| 3,018,808 | 1/62 | Belk | 146—236 |
| 3,030,990 | 4/62 | Polk | 146—3 |
| 3,030,995 | 4/62 | Shrewsbury | 146—236 |
| 3,072,160 | 7/63 | Grotewold. | |

J. SPENCER OVERHOLSER, *Primary Examiner.*